United States Patent [19]
Ohmi et al.

[11] Patent Number: 4,828,219
[45] Date of Patent: May 9, 1989

[54] METAL DIAPHRAGM VALVE

[75] Inventors: Tadahiro Ohmi; Yohichi Kanno; Osamu Uchisawa, all of Sendai; Kazuhiko Sato, Izumi, all of Japan

[73] Assignee: Motoyama Eng. Works, Lts, Sendai, Japan

[21] Appl. No.: 114,162

[22] Filed: Oct. 27, 1987

[30] Foreign Application Priority Data

Oct. 31, 1986 [JP] Japan ................. 61-258515

[51] Int. Cl.⁴ ............................. F16K 7/17
[52] U.S. Cl. .................. 251/118; 251/127; 251/63.5; 251/331; 251/368
[58] Field of Search ........... 251/331, 62, 63.5, 368, 251/118, 127

[56] References Cited

U.S. PATENT DOCUMENTS

| | | | |
|---|---|---|---|
| 619,216 | 2/1899 | Phillips | 251/331 X |
| 1,069,067 | 7/1913 | Huxford | 251/331 X |
| 1,121,105 | 12/1914 | Karlson | 251/331 X |

FOREIGN PATENT DOCUMENTS 60-23686 6/1985 Japan.

OTHER PUBLICATIONS

Nupro Company, Diaphragm Valve Catalogue, "Check and Relief Valves"(1973-1982).

Primary Examiner—Arnold Rosenthal
Attorney, Agent, or Firm—Nilsson, Robbins, Dalgarn, Berliner, Carson & Wurst

[57] ABSTRACT

A metal diaphragm valve in which the interior of a valve casing is divided, by means of a metal diaphragm, thereby defining a valve chamber. Inlet hole and outlet hole are connected to the valve chamber. A valve seat is provided between the inlet and outlet holes, inside the valve chamber. A valve disk adapted to rest on the valve seat, is formed integrally with the diaphragm. The valve disk is driven by a drive unit disposed outside of the valve chamber, to open or close the valve.

16 Claims, 6 Drawing Sheets

METAL DIAPHRAGM VALVE

BACKGROUND OF THE INVENTION

The present invention relates to a metal diaphragm valve, and more particularly, to a metal diaphragm valve adapted for use in pipe arrangements through which fluids of very high purity flow.

In such fields as the manufacture of semiconductors, fluids of very high purity are required. Valves incorporated in pipe arrangements for circulating such fluids must fulfill the following special requirements:

First, no impurities should be generated within the valves. Secondly, when a fluid circulating through the circuits is replaced with another one, none of the replaced fluid should remain in the valves. In other words, it should be relatively simple to remove replaced fluid from the valves.

Bellows seal valves are generally used in such pipe arrangements, and the purity of the fluid in fluid circuits having these valves therein is 1 ppm or thereabout. In place of the bellows valves, diaphragm valves have started to be used as valves adapted for fluids of higher purity. In general, a metal diaphragm valve comprises a flexible metal diaphragm which serves to isolate a valve chamber from the outside, the chamber containing a valve seat and a valve disk. With the aid of the diaphragm, drive means is used to drive the valve disk, to open or close the valve. In a conventional metal diaphragm valve incorporated is such pipe arrangements, a drive means is arranged outside a valve chamber, while a valve disk and a return means for restoring the valve disk, such as a return spring, are housed inside the chamber. The drive means is used to drive the valve disk with the aid of a metal diaphragm, and the return spring serves to restore the disk and the metal diaphragm to their original positions. In the case of the metal diaphragm valves constructed in this manner, since the valve chamber must receive the return means, this results in the chamber having so large a capacity, and replaced fluids cannot be expurgated readily therefrom. During actual operation, moreover, the valve disk and the return spring, or the disk and a valve seat, slide against each other, giving rise to the danger that metallic dust and other impurities will be produced. In another metal diaphragm valve of conventional type, an upper stem, which is driven directly by drive means, and a lower stem, which is coupled to a valve disk, are connected together through a metal diaphragm. The valve disk, which is housed within a valve chamber, is driven by the drive means and return means, arranged outside the chamber, through the medium of the upper and lower stems. In this way, the valve is opened or closed. With this arrangement, therefore, there is no return spring inside the valve chamber. In this diaphragm valve, however, the diaphragm must be formed with through-hole, to facilitate the connection between the upper and lower stems. Provision of the hole, unfortunately, entails a problem in that it is possible the fluid may then leak to the outside or become mixed with external foreign matter introduced therethrough. This problem becomes all the more serious with an increase in the frequency of valve operation. In this diaphragm valve, moreover, the valve chamber, which is expected to be able to house the lower stem therein, has so large a capacity that the fluid replacing capability of the valve is poor.

Processes of manufacturing VLSIs, for example, require use of fluids of higher purity or of the ppb-order level. Having the aforementioned problems, the conventional diaphragm valves cannot be suitably used to handle fluids of purity of the ppb order or higher level, which will possibly be needed in the future.

SUMMARY OF THE INVENTION

Accordingly, the object of the present invention is to provide a metal diaphragm valve which is suitably adapted for the flow control of high-purity fluids and has improved operational reliability and leakproof properties, such that no impurities can be generated therein, and replaced fluids can be expurgated therefrom with ease.

A metal diaphragm valve according to the present invention comprises a casing which includes a casing chamber defined therein, an inlet hole, and an outlet hole, one end of each of the holes opening into the casing chamber, and the other end opening to the outside of the casing. A flexible metal diaphragm is arranged in the casing, whereby the inside of the casing chamber is divided, in a fluid-tight manner, into a valve chamber, which is connected to the inlet and outlet holes, and a drive chamber. A valve seat is located between the inlet and outlet holes, inside the valve chamber. Valve disk integrally formed with the diaphragm and opposing the valve seat, the valve disk being adapted to rest on the valve seat, thereby cutting off the communication between the inlet and outlet holes. A drive means is arranged in the drive chamber, and is used to drive the valve disk with the aid of the diaphragm.

BRIEF DESCRIPTION OF THE DRAWINGS

Embodiments of the present invention will be described by way of examples and with reference to the accompanying drawings, in which.

DETAILED DESCRIPTION OF THE PREFERRED EMBODIMENTS

Embodiments of the present invention will now be described in detail, with reference to the accompanying drawings. In these drawings, like reference numerals refer to like portions throughout all of the views provided.

Figure 1:
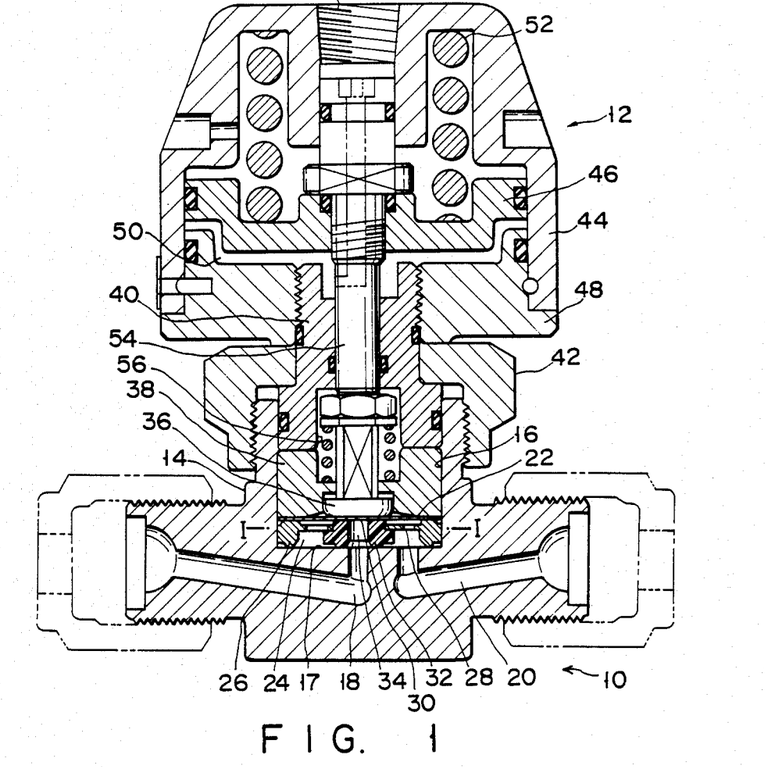
FIG. 1 is a sectional view showing a first embodiment of a metal diaphragm valve according to the present invention.
Figure 2:
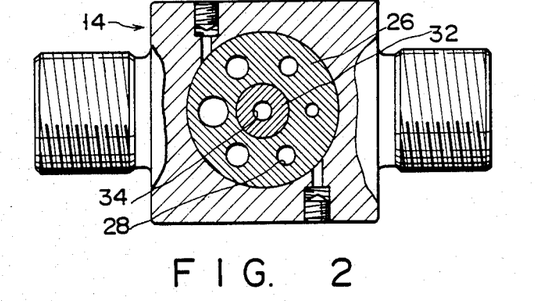
FIG. 2 is a sectional view taken along line I—I of FIG. 1.

FIGS. 1 and 2 show a first embodiment of a metal diaphragm valve according to the present invention. The metal diaphragm valve, which is of a normally-closed type, is driven by means of air pressure. The valve comprises valve body 10 and drive means 12 which is attached thereto and serves to open the valve.

Valve body 10 includes substantially rectangular casing 14, which has circular recess 16 at its upper end portion, as in FIG. 1. An external thread is formed on the outer surface of the upper end portion of casing 14, with a projection, for pipe enabling connection, protruding from each of two opposite ends thereof. Each projection has a thread formed on its outer peripheral surface, to enable it to mate with a conventional pipe coupling, with the extreme end portion of each projection being shaped so that it corresponds to a pipe coupling. Casing 14 has inlet hole 18 and outlet hole 20. Inlet hole 18 extends vertically downward from the central portion of bottom surface 17 of recess 16, and then extends substantially horizontally from the extreme end portion of the one projection. In a like manner to inlet hole 18, outlet hole 20, spaced a suitable distance therefrom, first extends vertically downward, and then extends substantially horizontally from the extreme end portion of the other projection.

Metal diaphragm 22 is arranged at the bottom of recess 16 of casing 14, and divides the bottom portion thereof from the outside, thereby defining valve chamber 24. Diaphragm 22 is a sheet, made preferably of nickel alloy, which has substantially the same outside diameter as recess 16, and is treated for improved strength and durability. In order to isolate valve chamber 24 in a fluid-tight manner, gasket 26 is interposed between diaphragm 22 and bottom surface 17 of recess 16. Gasket 26 is a ring-shaped planar member made of a conventional gasket material, has a center hole, and a sealing bead around its peripheral edge. This bead is pressed by diaphragm 22, in a manner which will be described a little later, such that its upper and lower portions are placed in tight contact with the diaphragm and bottom surface 17 of recess 16, respectively. In this way, valve chamber 24 is sealed in a fluid-tight manner. In addition, gasket 26 has a plurality of communication holes 28 arranged circumferentially at a suitable interval from one another, between the center hole and the bead on the peripheral edge portion, with respect its radial direction. As seen from FIG. 2, holes 28 of gasket 26 each have a different diameter. More specifically, the diameter of a hole 28 increases with its distance from outlet hole 20.

Valve seat 32 is located in valve chamber 24, and is in the form of a stepped hollow cylinder having valve hole 34 in the center. It is made of a conventional synthetic resin suitable for use as a sealing material. A small-diameter portion of valve seat 32 is guided or fitted into the center hole of gasket 26, so that valve hole 34 is situated substantially coaxial with the vertical portion of inlet hole 18. One end face of seat 32 is in contact with the central portion of the diaphragm which functions as valve disk 30, while the other end face is in contact with bottom surface 17. In this state, a passage of the valve is cut off. The respective wall surfaces of inlet and outlet holes 18 and 20 and valve chamber 24, which constitute the valve passage, are finished specularly to minimize adhesion and/or sorption of fluid. Roughness of the finished surface is less than 1 μm.

Within recess 16 of casing 14, stem 36, for use as an operating member of drive means 12, is disposed outside valve chamber 24. Stem 36 is in the form of a stepped cylinder, and preferably is made of stainless steel. The large-diameter-side end face of stem 36 is bonded to the central portion of diaphragm 22, preferably by the low-temperature diffusion bonding process. This bonding process is a method in which a base material is subjected to pressure and heat of a range such that it cannot be melted and can hardly suffer plastic deformation. Thus, the material is bonded in a solid phase by utilizing diffusion of atoms which is caused at the bonding surfaces. With use of such a bonding method, diaphragm 22 and stem 36 cannot be heated to such high temperatures as are reached in the case of welding, so that no coagulated structure can be produced. Thus, the bonding surfaces are free of pores, cracks, brittleness or other defects, which may otherwise be entailed during coagulation, and are less liable to change their mechanical properties. Also, the physical and chemical properties of the bonding surfaces are substantially the same as the base materials, respectively.

Within recess 16 of casing 14, moreover, bonnet 38 and support member 40 are arranged outside valve chamber 24. Bonnet 38 is substantially cylindrical, and is fitted loosely in recess 16. A bore of bonnet 38 serves as a guide hole, which is stepped so as to correspond in shape to stem 36. Stem 36 is guided by the guide hole. One end face of bonnet 38 is a ring-shaped concave surface such that deflection of diaphragm 22 cannot be prevented thereby. The peripheral edge portion of this end face is in contact with diaphragm 22. The other end face of bonnet 38 is in contact with support member 40. Member 40 is in the form of a stepped cylinder whose large-diameter portion is fitted in recess 16. An external thread is formed on the end portion of a small-diameter portion of member 40. An annular groove is formed on the outer peripheral surface of the large-diameter portion of support member 40. A dustproof and leakproof 0-ring is fitted in the groove, whereby the valve is protected against external dust and leakage. A shoulder portion between the large- and small-diameter portions can be pressed by its corresponding surface of bonnet nut 42, which is screwed on the external thread at the upper end portion of casing 14. The peripheral edge portion of diaphragm 22 is pressed, through the medium of support member 40 and bonnet 38, by bonnet nut 42 which is tightened with a suitable force. As a result, the bead of gasket 26 comes into intimate contact with the peripheral edge portion of diaphragm 22 and the bottom surface of valve chamber 24, so that chamber 24 is isolated fluid-tight from the outside.

A cylinder unit, which operates pneumatically as drive means 12, is disposed above valve body 10. The unit includes cylinder 44, piston 46, fixing member 48 by means of which the unit is mounted on valve body 10, and return spring 52 for returning piston 46 to its original position. Fixing member 48 has an internal thread which is adapted to mate with the external screw of support member 40. Cylinder 44 is coupled to fixing member 48, and piston 46 is guided in cylinder 44. Pressure chamber 50 is defined within cylinder 44 between piston 46 and member 48. Piston 46 is coupled with piston rod 54, which is connected to stem 36. Rod 54 and stem 36 are connected inside extended portion 56 of the respective bores of support member 40 and bonnet 38. Cylinder 44 has pneumatic port 58 which communicates with pressure chamber 50 inside cylinder 44.

The metal diaphragm valve operates in the following manner.

The metal diaphragm valve of the present invention is of a normally-closed type, so that piston 46 normally is returned to its original position shown in FIG. 1 by the restoring force of return spring 52 in the cylinder unit. In the original position as illustrated, piston 46 urges stem 36 downward through piston rod 54. Diaphragm 22 is bent by stem 36 so that valve disk 30 or the central portion of the diaphragm, on the opposite side thereof to stem 36, is pressed against valve seat 32. Seat 32 is pressed between and in intimate contact with the central portion of diaphragm 2 and bottom surface 17. In this position, therefore, the valve passage is cut off.

The valve is opened when air pressure is supplied to pneumatic port 58. Compressed air supplied to port 58 is introduced into pressure chamber 50, thereby retreating piston 46 upward, in the figure, against the restoring force of return spring 52. This movement of piston 46 is transmitted to stem 36 through piston rod 54. As stem 36 moves upward, diaphragm 22 is bent, so that valve disk 30 or the central portion of the diaphragm is pulled up. As a result, disk 30 leaves valve seat 32 to open the valve passage, so that the fluid flows from inlet hole 18 into outlet hole 20 via valve hole 34, the space between diaphragm 22 and seat 32, and communication holes 28 of gasket 26. After flowing through valve hole 34 to the side above gasket 26, within valve chamber 24, the fluid flows through holes 28 to the side below the gasket, and then runs out through outlet hole 20. Since communication holes 28 have different diameters, as mentioned before, the fluid flows more abundantly through the communication holes remoter from outlet hole 20. Thus, the flow of the fluid in valve chamber 24 can be made uniform, so that the replaceability of the fluid in chamber 24 is improved.

Figure 3:
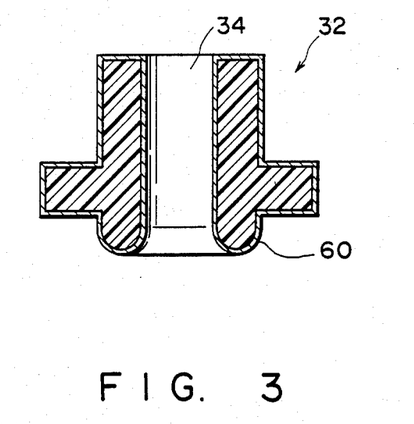
FIGS. 3 to 7 are partial sectional views showing modifications of the metal diaphragm valve shown in FIG. 1.

FIG. 3 shows a modification of valve seat 32 shown in FIG. 1. Generally, seat 32 is made of synthetic resin. When used as a material for the valve seat, synthetic resin, which is highly liable to absorb various gases, would release the absorbed gases, thereby possibly lowering the purity of the fluid. In this example, therefore, metal coating layer 60 is formed over the whole surface of seat 32. Layer 60 is obtained by coating the surface with metal, such as tungsten or tantalum, by chemical vapor deposition (CVD) or ion plating, for example. Since the plastic valve seat is thus coated with metal film, the fluid is restrained from being absorbed by the seat and from being released from the seat. Thus, valve seat 32 is restrained in its fluid absorbing capability peculiar to synthetic resin, without losing its sealing capability.

Figure 4:
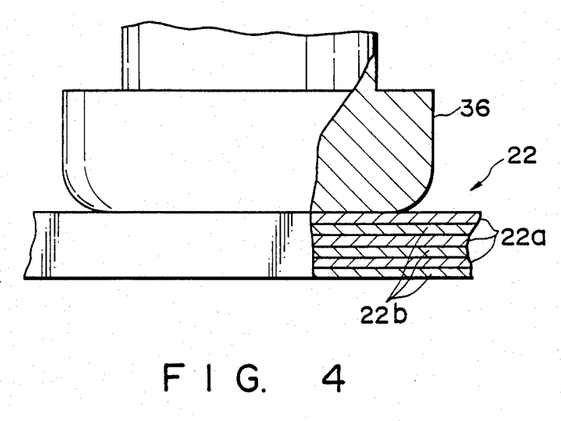

FIG. 4 shows a modification of a metal diaphragm used in the metal diaphragm valve of the present invention. In this example, metal diaphragm 22, which is intended mainly for high-pressure use, is formed by joining and bonding a plurality of sheets together. In doing this, the bonding strength can be increased by combining sheets 22a and 22b of different metals. For example, the bonding strength between stainless-steel stem 36 and diaphragm 22 formed of six nickel-alloy sheets proved to be about 15 kg at the maximum. As compared with this, that between stem 36 and diaphragm 22 formed of a six-layer laminate, including sheets of nickel alloy and beryllium copper arranged alternately, proved to be 50 kg or more. Similar effects may be expected of other combinations of sheets for use as diaphragm, such as nickel alloy and nickel, beryllium titanium, aluminum, or copper. If diaphragm 22 and stem 36 are made of different metals, moreover, the their bonding strength can be increased by interposing therebetween a metal material which can be easily bonded to both of them.

Figure 5:
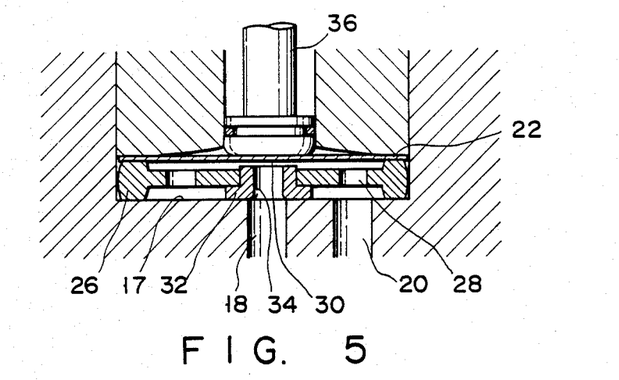
Figure 6:
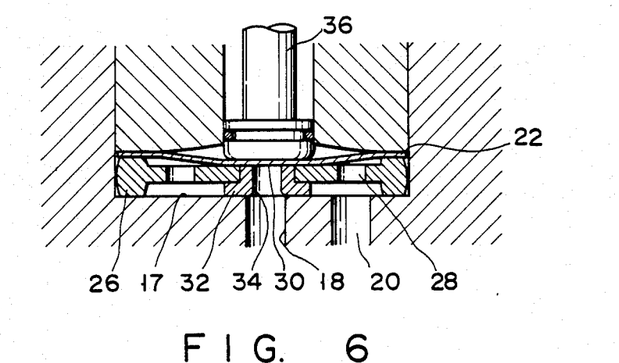

FIGS. 5 and 6 show modifications of valve seat 3 and gasket 26 used in the metal diaphragm valve of the present invention. In FIG. 5, the metal diaphragm valve is open. Valve seat 32 is pressed between diaphragm 22 and bottom surface 17 by means of a valve closing force produced by the drive means. A plastic valve disk, in particular, is deformed from fatigue after repeated use. Valve seat 32 is reduced in height by its fatigue deformation, and the amount of deformation of diaphragm 22 increases when the valve is closed. Thus, diaphragm 22 may possibly be broken in the end. To prevent this, in this example, gasket 26 is made of metal, and valve seat 32 and gasket 26 have dimensions such that if the valve is closed when the valve disk is subject to fatigue deformation of a predetermined critical level, diaphragm 22 abuts directly against gasket 26, as well as seat 32. With this arrangement, diaphragm 22 is prevented from being deformed further. FIG. 6 shows such a situation.

Figure 7:
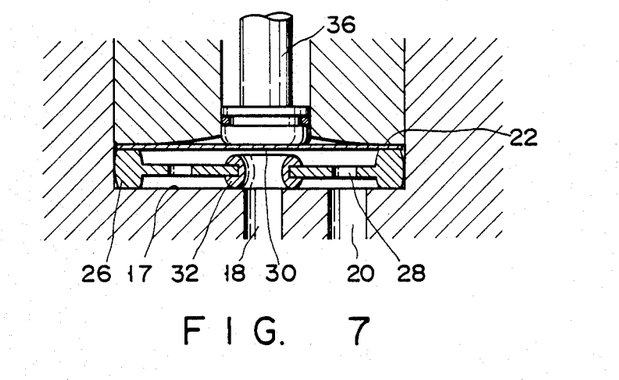

FIG. 7 shows further modifications of valve seat 32 and gasket 26. In this example, seat 32 is formed integrally with gasket 26. An inner peripheral bead of synthetic resin is formed at the peripheral edge portion of a center hole of gasket 26, on either side thereof. The bead constitutes valve seat 32.

Figure 8:
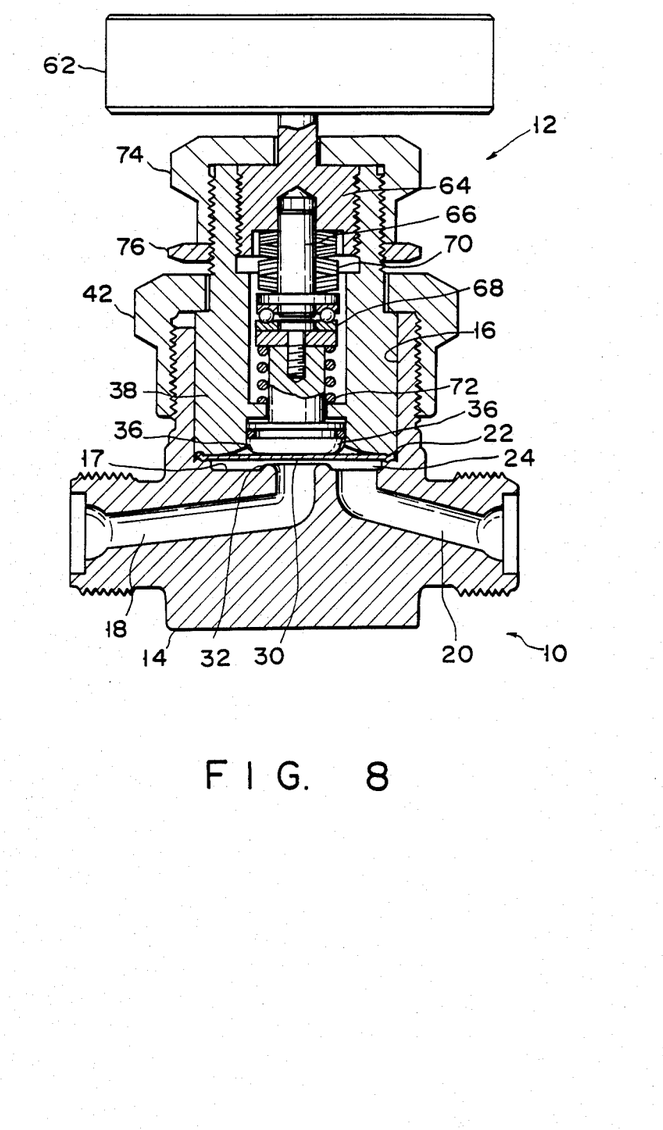
FIG. 8 is a sectional view showing a second embodiment of the metal diaphragm valve of the invention.

FIG. 8 shows a second embodiment of the metal diaphragm valve according to the present invention. This embodiment differs from the embodiment, shown in FIG. 1, only in respect of the construction of the valve chamber section and drive means. As regards other sections, the two embodiments are substantially identical. The metal diaphragm valve of FIG. 8 can be switched manually.

In this embodiment, recess 16 is located at the upper portion of casing 14, and has a ring-shaped stepped surface at the bottom portion. Disk-shaped metal diaphragm 22 is arranged on the stepped surface. Cylindrical bonnet 38 is loosely fitted in recess 16 of casing 14. Metal diaphragm 22 is interposed between the stepped surface of recess 16 and an end face of bonnet 38. By tightening bonnet nut 42 screwed on casing 14, the peripheral edge portion of diaphragm 22 is pressed against the stepped surface of recess 16 by means of the peripheral edge portion of the end face of bonnet 38. In this manner, valve chamber 24, which is defined by the bottom of recess 16 and diaphragm 22, is isolated, in a fluid-tight manner, from the outside. A ring-shaped gasket may be disposed between the stepped surface and diaphragm 22. Inside the valve chamber 24, an annular bead, for use as valve seat 32, is formed with bottom surface 17 of recess 16, in the vicinity of the junction between surface 17 and inlet hole 18. Valve chamber 24 is designed so that valve disk 30, i.e., the central surface of diaphragm 22, can comes into contact with valve seat 32 when diaphragm 22 is bent by drive means 12 through the medium of stem 36.

Bonnet 38 has a stepped guide hole at the chamber-side end portion thereof and a bore at its upper end portion, in which drive means 12 is housed. The stepped guide hole communicates with the bore. External and internal threads are formed on the outer and inner peripheral surfaces, respectively, of the upper end portion of bonnet 38. Perforated union nut 74 is screwed onto the external thread at the upper end portion of bonnet 38. Between nut 74 and diaphragm 22, components of drive means 12 are housed in the guide hole and the bore of bonnet 38.

Drive means 12 includes sleeve 64 which is in the form of a stepped cylinder. An external thread is formed on the outer peripheral surface of a large-diameter portion of sleeve 64. A stepped hole is formed in the end face of the sleeve on the large-diameter side thereof.

Sleeve 64 is coupled to bonnet 38 so that its external screw mates with the internal thread of the bonnet. The small-diameter-side end portion of sleeve 64 projects to the outside of the bore of bonnet 38 through an aperture in union nut 74, and is coupled to handle 62. One end portion of thrust shaft 66 is fitted, with a play, in a small-diameter portion of the stepped hole of sleeve 64. Shaft 66 has a bulging portion at the other end portion thereof, and belleville springs, for use as adjusting spring 70, are guided on shaft 66, between the bulging portion and a large-diameter portion of the stepped hole of sleeve 64. The other end portion of thrust shaft 66 is coupled to stem 36 via thrust bearing 68. Stem 36 has the form of a stepped cylinder and is fitted in the stepped guide hole of bonnet 38. Further, stem 36 has a collar on its small-diameter-side end portion. It is connected to thrust bearing 68 at the collared end portion. The other-side end face of stem 36 is bonded to diaphragm 22. Surrounding stem 36, return spring 72 is disposed between the collar of the stem and the bottom of that bore of the bonnet which contains the drive means.

The metal diaphragm valve of this embodiment, which is open in its original position, can be closed by turning of handle 62. As handle 62 is turned, sleeve 64 is rotated and moved forward, thereby advancing thrust shaft 66 through the medium of belleville springs or adjusting spring 70. As shaft 66 advances in this manner, stem 36, which is bonded to diaphragm 22, is advanced via thrust bearing 68. Thereupon, diaphragm 22 is bent, so that valve disk 30 or the central portion of the diaphragm is pressed against valve seat 32, thereby closing the valve passage. Since thrust shaft 66 is fitted in the guide hole of sleeve 64 with a play, the rotation of the sleeve cannot be easily transmitted to the shaft. Moreover, the moment of relative rotation of shaft 66 and stem 36 is practically absorbed by thrust bearing 68, so that no twist is caused between stem 36 and diaphragm 22. The pressure of valve disk 30 acting on valve seat 32 is adjusted by the agency of adjusting spring 70.

In this embodiment, the central portion of diaphragm 22 serves as valve disk 30, which comes directly into contact with valve seat 32, thereby cutting off the valve passage. In order to prevent seat 32 on casing 14 from being worn away, therefore, a softer material than that of the valve seat is used for diagram 22. This is because it is difficult to replace the casing installed in piping with the new one.

Figure 9:
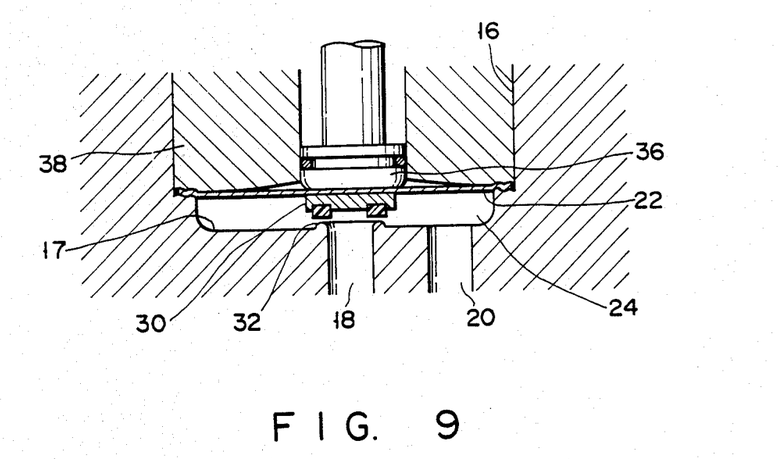
FIGS. 9 and 10 are partial sectional views showing modifications of the metal diaphragm valve shown in FIG. 8.
Figure 10:
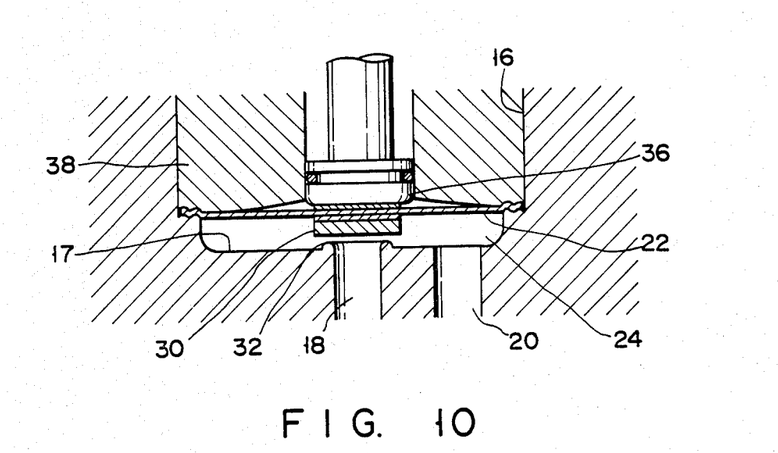

Generally, since strength and durability are essential to metal diaphragm, material of metal diaphragm is relatively high in hardness. FIGS. 9 and 10 show modifications of the embodiment shown in FIG. 8. In these modifications, valve disk 30 is formed integrally on the central portion of diaphragm 22, on the side of valve chamber 24. In the modification shown in FIG. 9, disk-shaped metallic valve disk 30 is bonded to diaphragm 22. Corresponding in position to valve seat 32, a plastic member is incorporated in disk 30. Since the plastic member in disk 30, which is bonded integrally to diaphragm 22, comes directly into contact with seat 32, the material of the diaphragm need not always be relatively low in hardness. In the modification shown in FIG. 10, a metal material softer than the material of valve seat 32 is used for valve disk 30. Disk 30 is bonded to diaphragm 22 with a sheet of another metal material sandwiched between them in order to facilitate low-temperature diffusion bonding. Likewise, stem 36 is bonded to diaphragm 22 with use of a sheet of a different metal material between the two. Such an arrangement can produce the same effects as aforesaid.

Figure 11:
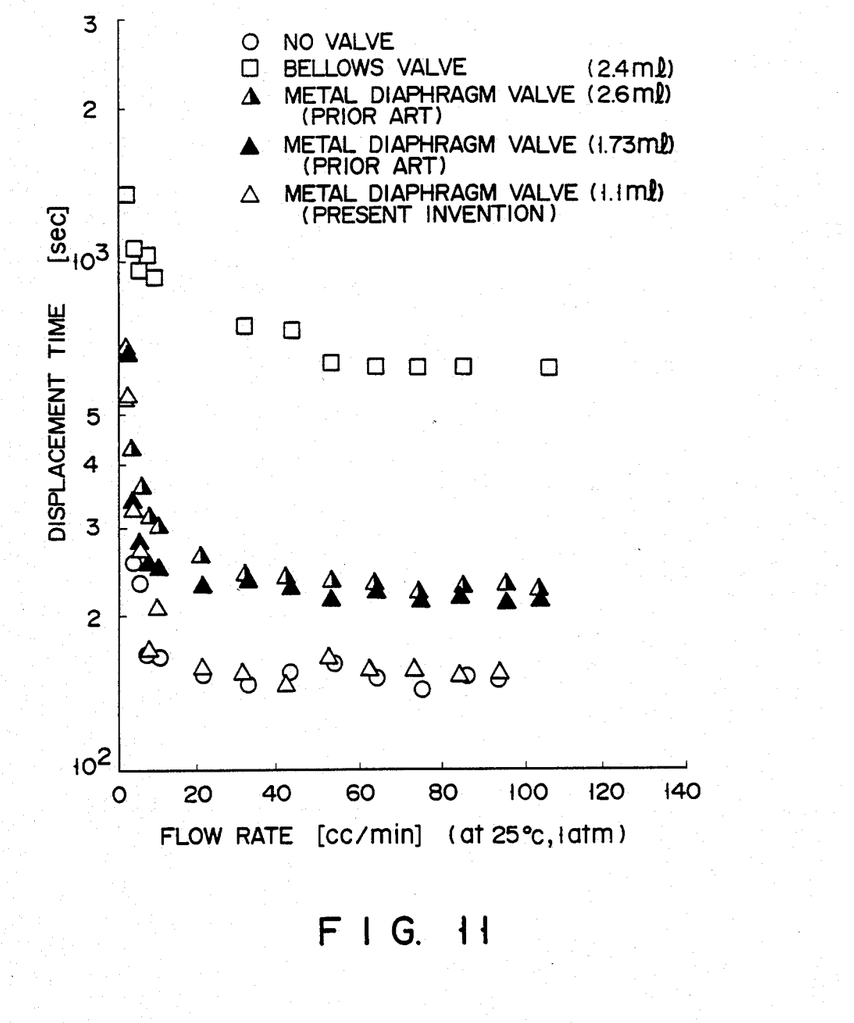
FIG. 11 is a graph showing the fluid replacing capability of the diaphragm valve according to the present invention shown in FIG. 1.

FIG. 11 is a graph showing the fluid replacing capability of the diaphragm valve according to the present invention shown in FIG. 1. For comparison with the diaphragm valve of the invention, the fluid replacing capabilities of a bellows seal valve and conventional diaphragm valves are also shown in FIG. 11. In this graph, parenthesized numerical values indicate the valve chamber capacity. The fluid replacing capability is measured as follows. Nitrogen and hydrogen gases are used as measurement fluids. A measuring apparatus used has a duct line in which the valves to be measured are incorporated. The hydrogen or nitrogen gas is supplied through the duct line from the upper-course side thereof, via a pneumatically-operated directional control valve. A gas chromatograph is connected to the lower-course side of the fluid duct line. Prior to the measurement, measures are taken such that either gas can be supplied through the duct line at the same flow rate. In the measurement, the nitrogen gas is first circulated at the predetermined flow rate through the duct line. Then, the directional control valve is switched to cause the hydrogen gas to be supplied through the duct line. While measuring the gas composition by means of the gas chromatograph, the time interval between the point of time of switching the control valve and the instant that the nitrogen gas in the duct line is replaced by the hydrogen gas to a degree of 99.9% is measured. This time is indicated as displacement time in FIG. 11.

As seen from FIG. 11, the fluid replacing capability of the diaphragm valve according to the present invention is much higher than those of the conventional diaphragm valve. With use of the diaphragm valve of the invention, the displacement time required is substantially the same as that required without the use of any valve. Thus, with the diaphragm valve according to the invention, it is possible to maintain the fluid purity of the ppb order for the fluid circuits, also on account of the absence of the sliding parts in the valve chamber, as mentioned before.

What is claimed is:

1. A metal diaphragm valve for a high-purity fluid which has a valve passage whose surface is mirrorfinished, said metal diaphragm valve comprising:
   a casing having a casing chamber formed therein and inlet and outlet holes each having one end connected to the casing chamber and the other end opening toward an outside;
   a flexible metal diaphragm by which said casing chamber is divided into a valve chamber and a drive chamber, said valve chamber being defined in a fluid-tight fashion and connected to said inlet and outlet holes;
   a valve seat provided within said valve chamber such that it is located between said inlet hole and said outlet hole;
   valve disk means for engaging said valve seat to cut off said valve passage within said valve chamber; and
   driving means located on the side of said drive chamber to drive the valve disk means via said metal diaphragm, said driving means including an operating member made of metal, and said operating member being diffusion-bonded to the metal diaphragm at a temperature low enough to develop no coagulated structure in the metal diaphragm whereby said operating member does not adversely affect that surface of said metal diaphragm which faces said valve chamber.

2. The metal diaphragm valve according to claim 1, wherein said valve disk means includes a valve disk formed of part of said surface of the diaphragm.

3. The metal diaphragm valve according to claim 1, wherein said valve disk means includes a valve disk bonded to said surface of the diaphragm.

4. The metal diaphragm valve according to claim 3, wherein said valve disk is bonded to the diaphragm by diffusion bonding.

5. The metal diaphragm valve according to claim 4, wherein said valve disk is bonded through the medium of a metal member made of a different material.

6. The metal diaphragm valve according to claim 1, wherein said operating member is bonded to the diaphragm through the medium of a different metal.

7. The metal diaphragm valve according to claim 1, wherein said diaphragm is formed by joining sheets of different metals.

8. The metal diaphragm valve according to claim 1, wherein said valve seat is a ring-shaped projection on the casing, surrounding that portion of the inlet hole opening to the casing chamber.

9. The metal diaphragm valve according to claim 1, wherein said ring member has a metal coating layer covering the complete outer surface thereof.

10. The metal diaphragm valve according to claim 1, further comprising limiting means for restricting flexure of the diaphragm within predetermined bounds.

11. The metal diaphragm valve according to claim 10, wherein said limiting means includes an abutting member surrounding the valve seat, and said seat surface of the valve seat projects over a predetermined distance from the abutting member.

12. The metal diaphragm valve according to claim 11, wherein said abutting member is made of metal.

13. The metal diaphragm valve according to claim 1, further including a valve seat member made up of a ring member having communication holes and retaining means for retaining the valve seat member to permit a fluid communication to be made with said inlet hole or said outlet hole, said valve member and said retaining means being provided within said valve chamber, and said valve seat being provided on said valve seat member.

14. The metal diaphragm valve according to claim 13, in which said retaining means includes a cover member extending between said valve seat member and said casing in a manner to traverse said valve chamber, said cover member having a plurality of through-holes for allowing a fluid communication to be made from said inlet hole into said outlet hole.

15. The metal diaphragm valve according to claim 14, further including a flow-rectifying means for allowing a substantially uniform flow of a fluid from said inlet hole into said outlet hole across the valve chamber.

16. The metal diaphragm valve according to claim 15, in which said flow-rectifying means includes a plurality of through-holes in said cover member and said through-holes are substantially equidistantly arranged between said valve seat member and said casing, the sizes of said through-holes being increased in accordance with their distance of a passage from said inlet hole to said outlet hole via said through-hole.

* * * * *